United States Patent [19]

Tramier et al.

[11] 4,174,278
[45] Nov. 13, 1979

[54] TREATMENT OF RESIDUAL EARTH DRILLING MUDS

[75] Inventors: Bernard Tramier, Pau; Michel Guillerme, Morlaas, both of France

[73] Assignee: Societe Nationale Elf Aquitaine (Production), France

[21] Appl. No.: 828,434

[22] Filed: Aug. 29, 1977

[30] Foreign Application Priority Data

Sep. 3, 1976 [FR] France ............................ 76 26592

[51] Int. Cl.$^2$ .............................................. B01D 21/01
[52] U.S. Cl. .................................. 210/51; 210/54; 210/73 W; 209/5
[58] Field of Search ............. 210/53; 175/66, 206, 175/51, 73; 252/8.5 R; 209/5, 59, 54 R

[56] References Cited

U.S. PATENT DOCUMENTS

| | | | |
|---|---|---|---|
| 1,928,398 | 9/1933 | Urbain | 210/53 X |
| 2,304,256 | 12/1942 | Huebel | 252/8.5 B X |
| 3,040,820 | 6/1962 | Gallus | 175/66 |
| 3,472,325 | 10/1969 | Lummus | 175/66 |
| 3,516,932 | 6/1970 | Meinich | 210/53 |
| 3,577,341 | 5/1971 | Keith | 210/53 X |
| 3,637,031 | 1/1972 | Hull | 175/66 |
| 3,737,037 | 6/1973 | Bone | 175/66 X |
| 3,846,293 | 11/1974 | Campbell | 210/53 X |
| 4,028,238 | 6/1977 | Allan | 210/53 |
| 4,046,684 | 9/1977 | Tsunoda | 210/53 X |

FOREIGN PATENT DOCUMENTS

| | | | |
|---|---|---|---|
| 2129035 | 10/1972 | France | 210/51 |
| 51-3132 | 1/1976 | Japan | 210/53 |

*Primary Examiner*—Robert Halper
*Attorney, Agent, or Firm*—Ostrolenk, Faber, Gerb & Soffen

[57] ABSTRACT

Treatment of residual earth drilling muds to achieve a partial dehydration of the same by addition of a series of flocculating agents and then mechanically separating the liquid of the mud from the flocculated solids.

4 Claims, No Drawings

TREATMENT OF RESIDUAL EARTH DRILLING MUDS

When earth drilling is carried out with the object of finding a layer of petroleum or natural gas, relatively large quantities of muds, formed by the liquid injected into the drilling shafts, have to be eliminated. These muds contain special, known adjuvants, which are used in this operation, and also the elements of the earth, particularly compounds of Si, Al, Ca, Mg, Fe, etc., and various organic materials. For this reason, they are very different from drainage muds and consequently cannot be treated by the conventional procedure, which is applied at the present time to these latter.

In actual fact, the drilling muds are more viscous and more hydrophilic, and have a very colloidal and thixotropic structure. They are essentially mineral and contain hydrocarbons, whereas the urban muds are mainly organic. In desert regions, the drilling muds are poured into hollows or depressions, so as to form mud pits; however, the effect of the physico-chemical properties of these muds is that the mud pits never completely solidify by natural evaporation, but constitute a muddy deposit, which is known under the name of "bog". The danger with this latter is that of persons and animals sinking thereinto, because of the rheological properties, which make it comparable with quicksand. It is not possible for mud pits of this nature to be left under natural conditions in habitated areas. The known means as so far proposed for the elimination of such mud pits are more or less difficult and costly to carry into effect: particularly involved is the transport of the bog deposits to a processing station, and also the operations of solidification or incineration.

Taking into account the very high content of water in the muds in question, which content may exceed 95%, combined with the colloidal nature of this liquid, making the mechanical separation of the solids, particularly by filtration or centrifuging, extremely difficult, it has not so far been possible to envisage this type of separation. The merit of the present invention resides in a new process which, contrary to the prior art, makes this mechanical separation industrially feasible.

The new process according to the invention consists first of all in treating the residual drilling muds by a suitable flocculating agent; the mud as thus treated is then subjected to filtration or to centrifuging opertion.

Flocculation agents which are suitable for carrying the process according to the invention into effect are particularly lime and iron salts. Although calcium hydroxide, ferric chloride or ferrous sulphate are known per se for their flocculating properties and are used for the dehydration of urban muds, they have not been employed in the preparation of a mud with a view to filtration or centrifuging; moreover, they have not been applied to the treatment of the particular class of muds which are as complex as those from petroleum drillings.

The coagulating treatment according to the invention has to be carried out in a manner such as to make the mud decidedly alkaline or decidedly acid, which means to say that it is necessary to use relatively large quantities of flocculation agent; thus, it is necessary to have more than 5% by weight of this agent, calculated relative to the solid materials (SM), the preferred proportions being between approximately 10 and 30%.

According to one particular feature of the invention, the flocculation, prior to mechanical separation, while being effected in alkaline medium, nevertheless comprises the addition of a ferric or ferrous salt. It is then established that the filtering capacity of the mud as thus treated is substantially improved and the result is obtained that the solid materials are separated, by filtration or centrifuging, from the mud in a less hydrated form.

In the embodiment of the invention in which the lime is employed in conjunction with an iron salt, the proportions of these two agents have to be regulated in such a way that there is 0.05 to 0.35 equivalent of iron per equivalent of Ca in the treated mud; the preferred proportion is from 0.1 to 0.3 equivalent of iron per equivalent of Ca; in this manner, it is not possible to have any neutralisation of the lime by double decomposition with the iron salt, only a minor part of the lime undergoing this reaction.

According to another preferred feature of the invention, the coagulating combination of lime with the iron salt has added thereto a small proportion of one of the organic flocculating agents which are known in industry under the name of polyelectrolytes. It is particularly the anionic polyelectrolytes which are suitable, and more especially the polyelectrolytes which are based on high molecular weight and partially hydrolysed polyacrylamides, of which the degree of ionisation exceeds 25%. It is especially the polyacrylamides with a degree of ionisation higher than 30% which give good results in the process according to the invention. Particularly advantageous results are obtained with about 0.2 to 0.4% of such an anionic polyelectrolyte, related to the weight of dry materials in the mud.

The flocculating preparation for the mechanical separation according to the invention can likewise be achieved by the addition to the muds of one of the aforementioned agents, for example, lime of ferric chloride, to which anionic polyelectrolytes are added; however, the best results are obtained with a ternary flocculation system, lime + iron salt + anionic polyelectrolytes.

When the mechanical separation after flocculation is filtration, this latter is preferably carried out under pressure, for example, in a pressure filter, the pressure being from 7 to 15 bars and preferably 15 bars. If a centrifuging operation is carried out instead of the filtration, it is possible to employ the various types of apparatus as known per se, which operate continuously or intermittently, with decantation or filtration, but an essential condition consists in the application to the mud of a centrifugal force of at least 2500 g and preferably 2900 to 3500 g.

The invention is illustrated by the partial dehydration of the petroleum drilling muds, which muds have the following characteristics:

appearance: colloidal, viscous and hydrophilic suspension, which is blackish in colour and has a marked odour of hydrocarbon;

pH 7.6, density 1.1, content of suspended solid material (SM) 55.2 g/l;

the solids of the mud are composed of 15% of organic matter and 85% of mineral substances.

The chemical analysis of these solid materials is set out as follows, in percent:

| burn-up | 21.6 | MgO | 5.1 |
|---|---|---|---|
| $SiO_2$ | 52.4 | $P_2O_5$ | 0.1 |
| $Fe_2O_3 + Al_2O_3$ | 0.2 | $Na_2O$ | 2.1 |

-continued

| CaO | 15.7 | K$_2$O | 1.8 |

It is seen that this mud is composed mainly of silicate and carbonate of calcium and magnesium; its blackish colouring is the indication of an anaerobic decomposition of organic substances, particularly hydrocarbons; it is by nature very colloidal, its constituents being finely dispersed and strongly hydrated.

In such a form, this mud could not be dehydrated by filtration, because it has a too high specific resistance $\alpha$ to filtration and compressibility factor. In effect, the following $\alpha$ values in m/kg are found as a function of the pressure gradient which is applied

| Bars | $\alpha \times 10^{-11}$ |
|---|---|
| 0.5 | 487 |
| 1 | 830 |
| 4 | 2500 |
| 7 | 4183 |

The compressibility factor s is equal to 0.81. The dryness limit, obtained under 7 bars, expressed in percent of dry material, is 38.8%.

The determination of the filtering capacity after the addition of lime, of FeCl$_3$.6H$_2$O, or both, to the mud, of which the characteristics are given above, lead to the results which are indicated in the following Table I. The filtering operations are carried out under a pressure of 7 bars. The percentage of lime and of ferric chloride are understood to be by weight of the SM of the mud. In order to indicate the degree of the dryness of the separated solids, the percentage of SM is indicated. The number of equivalents of iron per equivalent of calcium is indicated in the column Eq.Fe/Ca.

TABLE I

| % Ca(OH)$_2$ | % FeCl$_3$.6H$_2$O | Eq. Fe/Ca | $\alpha 10^{-11}$ | s | % SM |
|---|---|---|---|---|---|
| 10 | 0 | 0 | 930 | 0.75 | 41.0 |
| " | 5 | 0.205 | 540 | 0.74 | 41.8 |
| " | 10 | 0.41 | 1100 | 0.76 | 42.6 |
| 15 | 0 | 0 | 760 | 0.69 | 42.0 |
| " | 5 | 0.136 | 400 | 0.65 | 43.6 |
| " | 10 | 0.272 | 550 | 0.63 | 44.5 |
| " | 15 | 0.408 | 750 | 0.76 | 44.9 |
| 20 | 0 | 0 | 665 | 0.67 | 43.1 |
| " | 5 | 0.103 | 280 | 0.63 | 43.8 |
| " | 15 | 0.309 | 260 | 0.59 | 45.8 |
| 30 | 0 | 0 | 320 | 0.63 | 43.2 |
| " | 5 | 0.0685 | 320 | 0.56 | 46.8 |
| " | 10 | 0.136 | 350 | 0.62 | 46.9 |
| " | 15 | 0.205 | 142 | 0.53 | 48.2 |
| 0 | 7.5 | — | 1100 | 0.81 | 39.3 |
| " | 10 | — | 750 | — | — |
| " | 15 | — | 500 | 0.66 | 41.4 |
| " | 20 | — | 400 | — | — |
| " | 30 | — | 310 | 0.63 | 43.3 |

It can be seen that the addition of lime by itself is highly efficient, since it causes a fall in the resistance $\alpha$ from $4183 \times 10^{11}$ to $930 \times 10^{11}$ for 10% of lime and even to $320 \times 10^{11}$ for 30% of lime; however, the simultaneous addition of ferric chloride causes the resistance to fall in even greater proportions, until finally the value of $142 \times 10^{11}$ is reached for 30% of lime with 15% of ferric chloride. Nevertheless, it will be noted that, beyond a certain proportion of FeCl$_3$, the resistance once again rises: this is the case when there are 15% of lime with 15% of ferric chloride, corresponding to 0.408 equivalent of Fe per equivalent of Ca. It is the same when 10% of lime are used with 10% of ferric chloride. It is clear from the results in the preceding table that the best resistances, compressibility and dryness are obtained with the proportions of 0.1 to 0.3 equivalent of Fe per equivalent of Ca.

A certain improvement in the filtering capacity can also be obtained if, as well as the lime and an iron salt, the muds have added thereto 0.15 to 0.40% by weight of the SM of an anionic polyelectrolyte (particularly a product which is known under the commercial name "Seppifloc AN 34"). Although such an addition slightly increases the compressibility factor, it does however contribute to reducing the resistance $\alpha$ and to increasing the dryness. Thus, for example, with 0.2% of the SM of "Seppifloc AN 34" in the presence of 15% of Ca(OH)$_2$ and 5% of FeCl$_3$.6H$_2$O (fifth line of Table I), the resistance at 7 bars is reduced to $350 \times 10^{11}$ and the dryness is raised to 44.2%, while the compressibility s is increased to 0.85.

The above observations have been fully confirmed by pilot plant tests, where the muds as described above were treated in a filter press having 8 chambered plates of 300×300 mm, with a total filtration surface of 1 m$^2$. This filter was supplied from a tank with a capacity of 150 liters, in which the mud was agitated with its adjuvants, lime and iron salt, for the purpose of its flocculation. The supply of mud to the filter was effected by means of a high-pressure piston-diaphragm pump, capable of reaching 15 bars; the rate of flow was 1 m$^3$ per hour.

These pilot plant tests were carried out with proportions of flocculation adjuvants of 15 to 20% relatively to the SM of the mud, as regards the lime, and 5 to 7% as regards the ferric chloride. Other tests were carried out with 30% of lime and 10 to 15% of ferrous sulphate FeSO$_4$.7H$_2$O.

Thus, filtration capacities of 2.5 to 3 kg/SM/m$^2$/h were reached. The separation efficiency as regards the insoluble substances exceeded 99.5%, the filtrate titrating less than 100 mg of suspended matter per liter. The dry matter of the filtration cake contained 35 to 38% of SM and the handling thereof was very easy.

The treatment of the muds in accordance with the invention was also carried out by a centrifuging operation, after adding the previously described flocculating additives. Tests were undertaken with a Guinard D 18 continuous decanter with a full bowl, having a cylindrical part with a diameter of 18 cm for the sedimentation, extended by a conical part for the suction filtering of the sediment. The cylindro-conical assembly was able to rotate at an adjustable speed from 1500 to 6500 rpm. An extraction screw, rotating inside the bowl at an adjustable speed slightly higher than that of the bowl ensured the continuous extraction of the dehydrated mud.

When used on the same mud as that of which the characteristics were given above, in the present specification, the centrifuging procedure gave the results which are indicated in the following Table II.

The mud was treated beforehand with 20% of Ca(OH)$_2$ (relative to the SM) and 7% of FeCl$_3$.6H$_2$0 and it also had added thereto a certain proportion of anionic polyelectrolytes (Seppifloc AN 34) indicated in Table II.

TABLE II

| Speed of rotation rpm | Centrifugal force xg | Supply of mud kg/SM/h | Poly electrolytes % of SM | Yield % in SM | Dryness % SM in sediment |
|---|---|---|---|---|---|
| 6350 | 4000 | 21.6 | 0.35 | 98 | 28.5 |
| 5450 | 2920 | " | " | 99 | 26.3 |
| 3850 | 1475 | " | " | 99 | 21.4 |
| 5450 | 2920 | 33.75 | 0.30 | >99 | 29.2 |
| " | " | " | 0.25 | 99 | 26.4 |
| " | " | " | 0.20 | 98.4 | 24.8 |
| " | " | " | 0.16 | 85.8 | 20.1 |
| " | " | 47.0 | 0.40 | >99 | 33.3 |
| " | " | " | 0.30 | >99 | 30.7 |

It can be seen that, below a centrifugal force of 1500 g, the dehydration is insufficient and that the part played by the anionic polyelectrolyte is very important in centrifuging, since with 0.4%/SM of this additive, a dryness of 33.3% SM is reached, which represents a product very easy to handle, whereas below 0.2% of this additive, the dryness leaves much to be desired.

The filtration or centrifugation cakes which are obtained in the process according to the invention, although still including much water, can be very easily handled, can be easily transported and discharged into mud pits; these latter are no longer dangerous, because they are in course of time solidified in the open air. Thus, the mud pits, after discharge of the cakes from the filtration or centrifuging operations, can be used for filling purposes and returned to cultivation; they do not contain any toxic element.

We claim:

1. Method of dewatering muds from oil well drillings up to a content of more than 20% by weight of dry material, which comprises admixing the mud with a flocculating agent comprising 5 to 30 weight parts of calcium hydroxide per 100 weight parts of dry material present in the mud, wherein said flocculating agent contains an iron salt selected from the group consisting of ferric chloride and ferrous sulfate in a ratio of 0.05 to 0.35 equivalents of iron per equivalent of calcium and said flocculating agent contains 0.2 to 0.4 part weight of partially hydrolyzed polyacrylamide the degree of ionization of which exceeds 25% per 100 parts by weight of the dry material present in the mud, and then mechanically separating the liquid of the mud from the flocculated solids.

2. Method according to claim 1, wherein the ratio is 0.1 to 0.3 Fe equivalents per Ca equivalent.

3. Method according to claim 1, wherein said mechanically separating is carried out by filtration under a pressure of 7 to 15 bars.

4. Method according to claim 1, wherein said mechanically separating is carried out by centrifuging with a centrifugal force of 2500 to 3500 g.